United States Patent Office 3,150,034
Patented Sept. 22, 1964

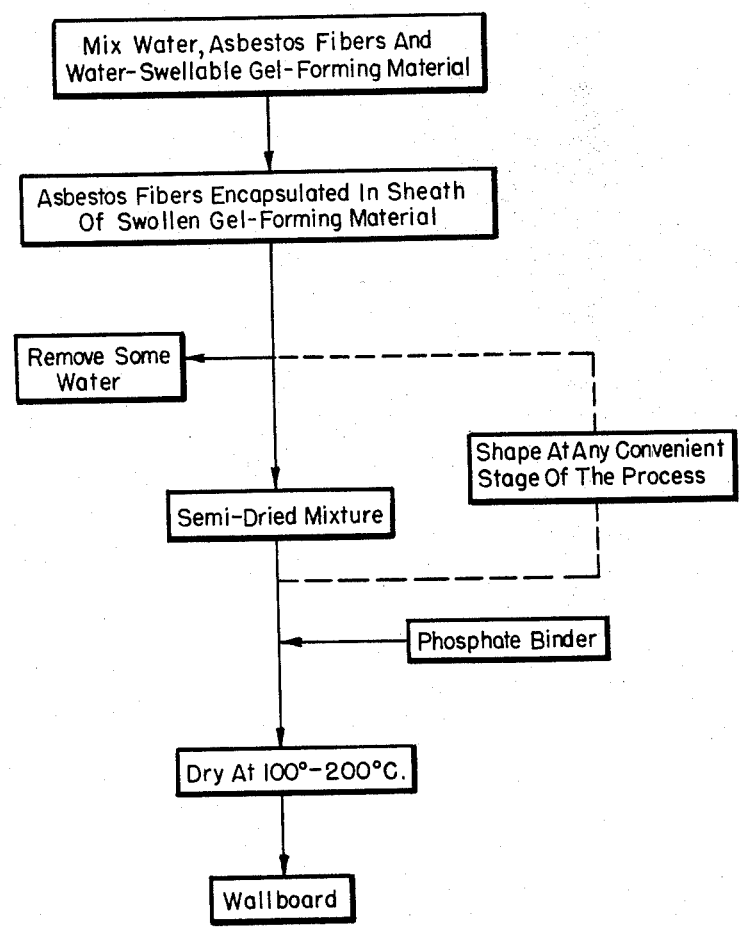

3,150,034
WALLBOARD AND METHOD OF MAKING SAME
Mark S. Vukasovich, Parma, and Jules Magder, Cleveland, Ohio, assignors to Horizons Incorporated, a corporation of New Jersey
Filed July 18, 1962, Ser. No. 210,823
6 Claims. (Cl. 162—155)

This invention relates to a wallboard or millboard product based primarily on asbestos fibers and to a novel method of producing the same. More particularly it relates to wallboard or millboard comprising specially treated asbestos fibers and phosphatic binder materials and to the manner in which they are prepared.

Asbestos is a hydrated magnesium aluminum silicate mineral which has a fibrous structure. Chrysotile, anthophylite, amosite, crocodilite, serpentine and other varieties of asbestos are known in which chemistry and relative proportions of the individual elements vary, e.g. as tabulated in Kirk-Othmer's "Encyclopedia of Chemical Technology," volume 2, pages 136 and 144–146.

Commercial asbestos "shorts" as they appear on the market are often a mixture of several of the mineralogical forms of fibrous asbestos. Asbestos shorts have been formed into board products by various methods, but the end products heretofore obtained have not possessed structural and physical properties sufficient for many modern requirements. Materials which have been added to asbestos in the formation of board products include alkali metal silicates, Portland cement, gypsum and other inorganic or organic bonding agents.

Asbestos and particularly asbestos shorts are commonly formed into wallboard or millboard by any of the applicable techniques for preparing wallboard, e.g. those described in pages 875–895 of volume 14 of Kirk-Othmer's "Encyclopedia of Chemical Technology." One widely practiced method comprises beating a mixture of asbestos shorts, water, and starch and/or bentonite and then forming thin sheets of the mixture on papermaking machines, and then laminating the sheets.

Other methods are known in which special binders are used either to improve the physical properties of the board product or to render it fire-proof, vermin-proof or otherwise useful.

It has been found that when metal phosphates in acidic solutions have been utilized as binders for asbestos board the flexibility characteristic of presently known asbestos board products is lost and a hard, brittle, non-flexible cold-set ceramic is produced.

When the reaction between asbestos fiber and these acidic phosphatic binders is examined under a microscope, the basis for the destruction of the desired flexible properties and strength imparting structure of the asbestos fiber is clearly seen. On contact between the two reagents, the surface of the asbestos fiber starts to gelantinize immediately and if the acid concentration is high enough this gelatinization extends throughout the fiber and if the amount of the phosphatic acid binder is kept low enough so that a portion of the interior fiber still remains, a result is obtained containing an interior structure of such fiber with a relatively thick shell of gelatinous material. On drying, the gelatinous material, comprised chiefly of siliceous gel material, produces a hard, stiff, brittle, horny, semi-translucent coat around each of the fibers and such coat is replete with easily visible micro cracks throughout its structure. A single bundle of asbestos fibers treated in such manner loses all semblance of the toughness, strength, and flexibility of the original fiber and even the slightest stress easily breaks the fiber into powder.

The present invention resides in the discovery that asbestos fiber compositions can be bonded with phosphatic binders without destroying the integrity and identity of the individual asbestos fibers and with retention of strength, toughness and flexibility which are desired in the finished board product, even when the board is subjected to temperatures as high as 2100° F.

One object of this invention is to provide an improved asbestos board product which can be nailed close to an edge without experiencing a breaking away of such edge and which will take a fine permanent thread for attachment of screws.

Still another object of the invention is the production of an asbestos board which is stable to the action of water or mild acids even when immersed therein for indefinite periods.

A further object is to provide asbestos wall board compositions which may vary in density over a wide range of densities, and which may therefore be produced to give desired heat insulation properties and desired structural properties, both of which vary with the density of the board product.

Still a further aspect of the invention resides in a technique for producing the novel products possessing the above properties.

Another object of the invention is to provide compositions which yield the above products, and which may be altered in order to vary the density and other properties in the products as desired.

These and other objects of the invention are accomplished by first encasing the individual asbestos fibers in a material which is chemically inert to the fiber and which exhibits the property of swelling or gelatinizing when exposed to water or water containing acids and thereafter introducing a phosphatic binder into the previously treated asbestos. When the encased fibers are treated with an acidic phosphatic binder, a controlled reaction takes place in which the chemical action of the phosphatic binder is restricted to the surface of the fiber and to a layer apparently only a few molecules in depth regardless of the length of time which the asbestos is exposed to the binder. This precisely controlled reaction and the accompanying formation of a desired physical structure is accelerated by increased temperatures and takes place with extreme rapidity at 100–150° C. The same results may be obtained less rapidly at lower temperatures. For example treatment for several hours at room temperature will yield the same reaction product as shorter treatments at higher temperatures.

While not wishing to be bound by an specific theory, our results lead us to believe that in order to practice this invention two classes of ingredients namely, metal ions and phosphoric acid in controlled and measured amounts are required to be presented to the surface of the asbestos fiber which is encased in the swellable material, and have further indicated to us that efforts to obtain the desired results by bringing the same two classes of materials into contact with asbestos shorts which have not been preconditioned by treatment with the swellable material have been wholly unsuccessful. Consequently it may be stated that the following constitute the essential features of this invention:

(1) Treatment of the asbestos with a minor amount of water-swellable material such as starch and/or bentonite;

(2) Removal of the majority of the water, e.g. by drying or by spray drying;

(3) Treatment of the dried mixture with a phosphatic binder, there being present both phosphate and metal ions, in controlled amounts;

(4) Drying of the phosphate-treated material;

(5) Shaping of the ingredients, e.g. by pressing, at any suitable stage of the process.

The process is shown schematically in the accompanying flow sheet.

Any of several methods may be utilized for producing the novel compositions of this invention. For example, normal millboard is produced by the usual techniques by preparing a mix in a beater comprising a mixture of asbestos shorts in a minor amount of a water swellable material such as starch or bentonite or a combination of both. After the board is fully formed and the majority of water removed from the board in the drying cycle, this board is then impregnated with a clear solution of the phosphatic acid binder and the drying cycle then completed. A variation of this procedure involves producing the initial mix and then spray drying the beater batch. This not only produces the beater batch as a dried, fibrous, fluffy material but provides a product in which each of the fibers is encased in the water swellable inert material. The spray dried material is then mixed with a concentrated solution of phosphatic acid binder and formed to shape by press techniques and thereafter dried at the temperature most suitable for the specific composition. The drying temperatures usually are in the range of 100 to 150° C.

Examination of these structures, both in the forming stage and the final stage, indicates that a different chemical and physical structure has been achieved, than was obtained when untreated asbestos fibers were mixed with a phosphatic material which was acidic. By examining dried layers of pure asbestos paper containing an overcoat of the water swellable inert jackets and examining the product obtained by thereafter treating the overcoated asbestos with the phosphatic acid binder, it is found that that water swellable material restricts and controls both the degree of reaction and the nature of the movement of the phosphatic acid binder. To a certain extent it appears that the water swellable layer acts as a chromatographic separation medium with the result that the amount of acid penetrating this layer is at a much lower concentration than the amount originally applied at the outer surface of the coating. A small but proportionately lesser amount of metal ion also penetrate. As a consequence of the transport of this small amount of phosphatic acid material through the coating layer, a restricted reaction takes place at the surface of the asbestos fiber producing a very small amount of silica gel and ions of magnesium. The formation of such magnesium ions results in the further formation of an insoluble phosphate precipitate probably containing a mixture of magnesia, silica and $P_2O_5$ and, as a consequence, the reaction stops immediately. On the opposite side of the inert film away from the asbestos fiber, the metal content has been increased relative to the $P_2O_5$ content as a function of the more rapid transport of the acid portions through the inert gelatinized barrier to the extent that precipitation and crystallization takes place very rapidly forming an interlacing network of bonding crystals of a high degree of stability. The interlocking crystal structure of the phosphatic acid binder and the asbestos appears to be a multi part physical composition. In the interstices furthest away from the fiber itself, a precipitated metal phosphate is found free from asbestos constituents. The amount of deliberately added metal phosphate in the bond then decreases through the narrow thickness afforded by the inert gelatinized material which was added as an overcoat to the asbestos fiber. Shortly before the asbestos fiber is reached, another type of phosphatic acid base bond is observed, consisting chiefly of magnesium silica phosphate. Behind this is still another layer whose composition is estimated to be a few molecules thick of substantially pure silica gel after which is found a core of the original fibrous mineral.

It has also been observed that the metal ion portion of the intruding phosphatic acid binder is one requirement for developing the proper series of conditions. For example, if a starch encased asbestos fiber is treated with phosphoric acid alone, the desired bonding conditions and structure are not achieved, but if the asbestos fiber is encased in water swellable bentonite, either as a total or partial replacement for the starch, then the desired improvements are achieved by treatment with phosphoric acid alone but not to the extent as that exhibited by a metallic ion containing phosphatic acid binder. It is thus clear that two important ingredients in controlled and measured amounts, both as far as the asbestos fiber is concerned, and as far as the ratio to each other is concerned, are brought to the surface of the asbestos fiber through the use of the semi-permeable membranes defined in this specification.

In attempting to duplicate this action without the presence of the semi-permeable membrane in the forming stage using a wide variety of combinations of metal ions and phosphoric acid and concentrations thereof, both relative to each other and relative to the asbestos, the development of a final structure exhibiting the desired strength and flexibility was not achieved. It was also noted that the desired combination of metal ions and phosphate ions brought momentarily to the surface of the asbestos fiber for developing the desired bonding conditions is unstable under normal conditions and produces a precipitate almost immediately which exhibits no bonding characteristics. Such precipitates are obtained when the amount of divalent metal ion or trivalent metal ion is present in a gram atom ratio relative to the phosphorus atom in water solution of greater than 1 to 3. At a concentration of 2 to 3, the initiation of precipitation is immediate and is complete in a few minutes and, at a concentration of 1 to 1, the precipitation is complete simply on mixing.

The technique described above has been found to provide a means for bringing to the surface of the asbestos fiber a combination of di- and/or trivalent metal ions and $P_2O_5$ in which a controlled concentration is produced in situ which completely forms an insoluble compound at the surface of the asbestos fiber, in an amount just sufficient to produce the desired reaction to the extent and degree desired at the surface of the asbestos fiber. Any further deleterious reaction is prevented as a consequence of the formation of insoluble products at the surface of the fiber. The phosphatic reaction products then act not only as a bond, but at the same time protect a residual asbestos substrate in which all of the factors of strength, toughness and flexibility are retained.

As indicated, this multi component chemical and physical structure of novel nature has been defined by careful experiments carried out under microscope, and through knowledge of the precipitation chemistry of the various reagents it is clear that the chemistry obtaining which enables the desired controlled reactions to take place, is as described in the preceding paragraphs.

THE INERT WATER SWELLABLE GEL FORMERS

The amounts of water swellable gel formers which are utilized for the purposes of encasement of the individual asbestos fibers are preferably in a range of 0.5% to 5.0% by weight of the short fiber asbestos in the wallboard composition. Generally speaking, the longer the average length of the fiber, the less the amount of gel former required, and conversely, the greater the amount of shorts or asbestos wastes used in the composition, the closer to the highest portion of this range is utilized. Since the usual millboard composition comprises a major amount of short length fiber and a lesser or minor amount of somewhat longer length fiber in order to hold the mass together during forming, an optimum amount of gel former irrespective of the class of gel former utilized is generally in the range of 2 to 3% by weight of the asbestos fiber.

Both organic and inorganic materials may be used as gel forming materials encasing the asbestos fibers, the only other requirement being that they be also chemically inert and unreactive with the asbestos.

Suitable organic gel formers include natural water soluble gums, starches and glues such as dextrinized corn starch, gum arabic, gum tragacanth, and glue. Synthetic water-soluble gel formers may also be utilized such as polyvinyl alcohol, methyl cellulose, or polyacrylamide.

Inorganic gel formers are also useful in the compositions, either alone or mixed with the organic gel formers. The most suitable of the inorganic gel formers are the minerals bentonite (chiefly a hydrated magnesium silicate), eyerite (chiefly a hydrated magnesium aluminum silicate), and attapulgite (chiefly a hydrated magnesium aluminum silicate). Synthetic gel formers such as aluminum monohydrate (boehmite) may also be used, but their use is academic from the standpoint of economy in view of the low cost and availability of the colloidal clay type minerals listed previously.

All of these materials, whether organic or inorganic, when at room temperature and in dry form are available as dry, stable powders and in concentrations of 1 to 3 grams per hundred cc.'s of water, they tend to form stable gels on standing. For the synthetic organic materials the type which exhibits standard viscosities of the order of 10,000 cps. or higher fall into the category just described. All of these gel formers exhibit reversible properties. In other words, if once placed in water solution and gelled and then dried under proper circumstances, the dried material again exhibits the water swelling characteristic as before and this cycling may be repeated indefinitely without harm to the desired physical characteristics of the material.

Finally, the choice of the gel forming material is dictated to a certain extent by the nature of the phosphatic material to be used. If the phosphatic bonding agent contains a substantial amount of metallic ion of the type to be described in the next section substantially any of these water soluble reagents may be utilized alone or in mixture. If the bonding agent is comprised either of phosphoric acid or a nonmetallic ion containing acid derivative of phosphoric acid such as ammonium hydrogen phosphate, then the gel former must be comprised of at least 50% of one of the inorganic members such as attapulgite, eyerite and/or bentonite or similar colloidal clay type mineral.

THE PHOSPHATIC ACID BINDER

The phosphatic acid binders are, in concentrated form, viscous, tacky, clear solutions of metal oxides in phosphoric acid, such as calcium oxide, aluminum oxide, nickel oxide and iron oxide and mixtures thereof. In the case of the trivalent metal oxides such as those of aluminum, nickel and iron stable solutions in 50% concentration are obtained from mixtures exhibiting a mole ratio of phosphorus pentoxide to each mole of trivalent oxide. In the case of calcium oxide, similarly stable viscous and tacky solutions are obtained by a mixture equivalent to a mole ratio of 3 moles of phosphorus pentoxide, to 2 moles of calcium oxide. The usual technique of preparation is to prepare a mixture of the appropriate amount of concentrated phosphoric acid and the hydrate or carbonate of the metals listed, heat until the concentration of metal phosphate has been reduced to that equivalent to 50 parts by weight in 100 parts by weight of total solution and then allowing the solution to stand for 24 hours. As a result of such standing, all precipitates go into the solution and a clear viscous solution is then achieved. These materials will remain in such clear form indefinitely when stored in a bottle. However, if diluted with water to any substantial extent or if the acid concentration is otherwise reduced, precipitation takes place and it is found that through the addition of a small amount of fresh phosphoric acid prior to the dilution so as to provide a ratio of $P_2O_5$ slightly above the 3 to 1 ratio given previously that stable solutions even when diluted with water are available.

Solutions made as just described are utilized with those types of water swellable gel forming materials which contain little or no inorganic content, i.e. the water soluble gums, both natural and synthetic, and starches and glues described above.

Phosphoric acid may be utilized to a limited extent by itself providing the bonding agent used as an overcoat consists of at least 50% of an inorganic gel former. While the results obtained from phosphoric acid alone represent in themselves an improvement over that available in its absence, still the metal ion containing material produces a superior result. A result substantially comparable to that available from the use of the phosphatic acid binder containing metal ions is available through reduction of the pronounced corrosive effect of phosphoric acid by substituting it with an ammonia containing phosphorus material such as diammonium hydrogen phosphate. Again, such diammonium hydrogen phosphate exhibits its best results in the presence of a gel former of inorganic nature, such as the colloidal clays above.

The preferred range of phosphatic acid binder utilized for the purpose of developing strength in an asbestos board while still retaining toughness and flexibility falls in a percentage range such that the fully cured board will have been increased in weight by 5 to 20%. For low density, high insulation materials percentages in the lower ranges are utilized. For high density, high strength and temperature resistant varieties ranges close to the higher levels are utilized.

Within the limits of optimum ranges given in this specification, percentages higher than 20% produce a structure in which the flexibility and toughness of the asbestos fiber is lost, indicating that by going outside these ranges to any large extent, that the control of attack at the surface of the asbestos fiber has been lost and as a consequence the desired properties to be imparted to the millboard have been lost.

The following examples are illustrative of composition and method of practice of this invention and are not to be construed as limiting the invention in any way.

Example 1

An asbestos millboard was made up by first beating a mixture of 90 parts by weight of asbestos shorts, 10 parts by weight of asbestos fiber of an average length of ¼", 2 parts by weight of dextrinized corn starch and 400 parts by weight of water. This mixture was beaten and then formed into sheets on a papermaking machine and finally laminated into board which after drying exhibited thickness of ¼". A section of this dried board in the form of a square 30" on an edge and ¼" thick was found to weigh approximately 4000 grams.

A concentrated master solution of aluminum phosphate was prepared comprising 50% by weight of an aluminum phosphate in which the ratio of phosphorus to aluminum was equivalent to 3 moles of phosphorus pentoxide to 1 mole of aluminum oxide. 400 grams of this aluminum phosphate solution was mixed with 20 grams of concentrated phosphoric acid of specific gravity 1.73 and the resulting mixture was then added to 4000 grams of water and stirred vigorously. A clear, low viscosity solution was obtained.

The section of predried asbestos millboard was impregnated with the prepared solution by pouring the total quantity of liquid onto the porous board. The solution appeared to be totally absorbed. The sample was then pressed lightly at 40 lbs. per square inch to facilitate wetting and equal distribution of the solution. It was observed that on pressing some solution reappeared around the edges of the sample and that this was immediately reabsorbed on releasing the hydraulic pressure. The sample was removed from the press and oven dried at 120° C. for 2 hours. On weighing it was found that the sample contained 9.1% nonvolatile impregnant as an additive.

The cross breaking strength of the original millboard before treatment with the aluminum phosphatic material was found to be approximately 80 to 100 lbs. per square inch. After treatment with the aluminum phosphate, pressing and heating as described the cross breaking strength was 860 lbs. per square inch. After treatment a nail pounded into the corner of the treated board retained the stress completely. On heating to 1500° F., the untreated board disintegrated into a powder whereas the treated board retained its form and was found now to have a cross breaking strength of 1200 lbs. per square inch. The treated board was tough and flexible, and could easily be handled for installation purposes without fear of breaking under its own weight. It was stable structurally even after lengthy immersion in hot water.

*Example 2*

The mixture of 90 parts by weight of asbestos shorts, 10 parts by weight of asbestos fibers of an average length of ¼", 2 parts by weight of corn starch was made up as before and the material was then placed in the beater with 600 parts by weight of water. After being thoroughly beaten, the material was then spray dried by blowing into a hot air chamber with a flock gun. The individual flocks were broken up by mulling lightly for about 20 minutes. 4000 grams of such asbestos corn starch mixture was then mixed with a solution containing 400 grams of aluminum phosphate in which the ratio of phosphorus to aluminum was 3 gram atoms of phosphorus to 1 gram atom of aluminum, 20 grams of phosphoric acid of specific gravity 1.73 and 1000 grams of water, until a mealy wet mix was obtained. This material was then pressed to shape in a hydraulic press at a pressure of 200 lbs. per square inch and then dried for 2 hours after removing from the press at 120° C. After drying the pressed material the cross breaking strength of the material was found to be 790 lbs. per square inch and other properties of flexibility, toughness, the ability to accept nail holes without cracking and the like were exhibited as before.

*Example 3*

The procedure followed in Example 1 was repeated except that the aluminum phosphate solution was replaced with the same weight of a similar nickel phosphate solution. The board obtained after drying was pale greenish in color, exhibited a cross breaking strength of 980 lbs. per square inch, did not disintegrate on heating at 2100° F., and showed the improved flexibility and toughness exhibited by the similar material made as in Example 1.

*Example 4*

The procedure followed in Example 1 was repeated except the aluminum phosphate was replaced with an equivalent weight of iron phosphate similarly produced. In this case a cross breaking strength of 900 lbs. per square inch was obtained, after drying.

*Example 5*

The procedure followed in Example 1 was repeated except that the aluminum phosphate was replaced with an equivalent amount of calcium phosphate in which the phosphorus calcium atom ratio was 3 to 1. In this case a cross breaking strength after drying of 740 lbs. per square inch was achieved.

*Example 6*

The same as in Example 1 except that the impregnating solution comprised a mixture of 670 grams of the aluminum phosphate concentrated master solution, 30 grams of phosphoric acid of specific gravity 1.73 and 2600 grams of water. After drying, the lightly pressed board at the temperature indicated in Example 1 a cross breaking strength of 1360 lbs. per square inch was achieved. The weight of the originally nontreated board was increased by 14.6%.

*Example 7*

In this example, the composition and method as used in Example 6 was repeated except that the amount of water used in the impregnating solution was diminished and a small amount of nonionic wetting agent was added in its stead. In place of the 2600 grams of water for impregnating purposes, 1000 grams of water was utilized together with 5 grams of wetting agent designated by Rohm and Haas as Hyamine 2389 and understood to be alkylated tolyl methyl trimethyl ammonium chlorides. Again, after drying, a board showing an increase in weight of 14.6% and a cross breaking strength of 1350 lbs. per square inch was obtained.

It should be noted that other wetting agents which function in acidic liquids may be used in place of Hyamine 2389, and this includes those wetting agents known generally classed as either cationic or nonionic.

*Example 8*

The procedure as given in Example 1 was repeated except that the impregnating solution was a mixture of 1000 grams of the aluminum phosphate concentrated material, 50 grams of phosphoric acid of specific gravity 1.73, 2000 grams of water and 10 grams of the same nonionic wetting agent, Hyamine 2389. After impregnation and drying, the dried finished panel was found to have been increased in weight by 20.0% and the cross breaking strength was 1800 lbs. per square inch. On a qualitative basis, a noticeable but slight loss in flexibility was evident.

*Example 9*

Example 8 was repeated except that instead of oven drying, the board was dried at room temperature for 50 hours. A cross breaking strength of 1510 lbs. per square inch was achieved and the weight gained was 20%.

All of the impregnated boards produced in the foregoing examples were subjected to a number of quality tests. While these samples were unquestionably harder than unimpregnated board, they could be sawed easily with no fraying or fracturing along the saw line. They could be nailed or screwed to plywood back plates with no fraying or chipping. Conventional asbestos millboard delaminated and frayed badly along the saw lines and if nailed to a backboard near a corner, the corner would chip off. The impregnated samples whether heat treated or not could be subjected to tap water at 170° F. indefinitely without effect, while the untreated board disintegrated immediately. At temperatures of the order of 1500° F., untreated board disintegrated to a powder within a few minutes and substantially immediately at 2100° F. At 1500° F. the treated board became somewhat more brittle, but still retained a large portion of its toughness and flexibility. At 2100° C., the treated board developed a glaze and on cooling was strong, distinctly brittle, but still retained its original shape.

The following examples illustrate the use of inorganic gel forming materials as the protective coating for the asbestos fibers.

*Example 10*

A millboard was produced by beating a mixture of 90 parts of asbestos shorts, 10 parts of asbestos fiber having an average length of ¼", 2½ parts of Wyoming Bentonite and 400 parts by weight of water. A board was produced in the usual manner on papermaking machines and dried at 120° C. so as to remove all water. A square of board weighing 800 grams was saturated with a solution made up of 200 grams of diammonium acid phosphate in 400 grams of water. The distribution of the solution was ensured by hydraulic pressing at about 100 lbs. per square inch. The impregnated board was then dried at 125° C. for 2 hours. Such a board exhibited a strength of 900 lbs. per square inch, after drying.

*Example 11*

The procedure followed in Example 10 was repeated except that the bentonite was replaced with eyerite in the same amount and in this case a strength of 940 lbs. per square inch was obtained.

*Example 12*

The procedure followed in Examples 10 and 11 was repeated except that the eyerite or bentonite was replaced with an equivalent weight of attapulgite and a strength of 890 lbs. per square inch was achieved.

*Example 13*

An asbestos board composition made up of 90 parts by weight of shorts, 10 parts by weight of asbestos fiber approximately ¼" in length, 2½ parts by weight of eyerite and water was made up on a paper-making machine, as before. After drying to constant weight, a sample of such board roughly 30" x 30" x ¼" thick was found to weight approximately 4000 grams and was saturated with a solution comprising the following: 400 grams of concentrated aluminum phosphate equivalent to 50% by weight of $3P_2O_5:1Al_2O_3$, 20 grams phosphoric acid of specific gravity 1.73 and 4000 grams of water. The impregnation was accomplished as before, namely by pouring the total quantity of solution onto the porous board and the solution again appeared to be totally absorbed. The sample was then pressed lightly at a pressure of 50 lbs. per square inch to facilitate wetting of the asbestos and equal distribution of the solution. Again, as before, on pressing, some solution reappeared on the edge of the sample which was immediately reabsorbed on releasing the hydraulic pressure. The sample was removed from the press and oven dried at 125° C. for two hours and on weighing it was found that the original millboard had increased in weight by approximately 9.3%. The cross breaking strength of such a sample was 1250 lbs. per square inch with manifest evidence of the desired flexibility and toughness required in such board.

*Example 14*

A mixture of 100 parts by weight of short fiber asbestos, 3 parts by weight of eyerite was dispersed in a beater with 400 parts by weight of water and beaten thoroughly until a smooth mix was obtained. The material was then spray dried by blowing into a hot chamber maintained at 200° C. The dried powdery mix was broken up in a muller to remove flocks. 4000 grams of this mix was then mulled with a liquid containing 400 grams of the concentrated aluminum phosphate master solution previously prepared, 20 grams of phosphoric acid of specific gravity 1.73 and 1000 grams of water to produce a mealy damp mix. This was placed in a press in which the platens were previously heated at 90° C. and the shape formed at a pressure of 1000 lbs. per square inch. After retaining the pressure for 5 minutes, the temperature was increased to 125° C. for 10 minutes longer, after which the pressure was released. On removal from the press, and cooling to room temperature, the specimen was found to exhibit all of the desired characteristics of a highly useful wallboard and showed a cross breaking strength of 920 lbs. per square inch.

We claim:

1. A method of preparing wallboard or millboard products which comprises preparing an aqueous mixture consisting essentially of asbestos fibers and between 0.5% and 5% by weight of a water-swellable reversible gel-forming material; mixing the composition until the asbestos fibers are coated by a sheath of the then swollen water-swellable gel-forming material; drying the mixture for a period sufficient to effect removal of a major proportion of the water from said mixture; and thereafter introducing an acidic phosphate binder selected from the group consisting of phosphoric acid, non-metallic acid phosphates and acidic solutions of metal phosphates, into the semi-dried material in an amount sufficient to constitute between 5% and 20% by weight of the final product on a dry basis and then drying the phosphate-bonded gel-sheathed asbestos fibers at a temperature between 100° C. and 200° C. at least one of said gel-forming material and said acidic phosphate binder, containing metallic ions selected from the group consisting of divalent and trivalent metal ions which form water insoluble phosphates.

2. The method of claim 1 wherein the water-swellable material is a colloidal clay.

3. The method of claim 1 wherein the first drying step is a spray drying and the phosphatic binder is introduced into the spray dried product by mixing the spray dried product with the phosphatic binder.

4. The method of claim 1 wherein the first mixture is formed into a board product on a paper making machine and the phosphatic binder is introduced into the board product as an impregnant.

5. The method of claim 1 wherein the gel former is starch and the acidic phosphate binder is an acidic aluminum phosphate in which the mol ratio of $P_2O_5$ to $Al_2O_3$ is at least about 3:1.

6. A wallboard or millboard comprising: a matrix consisting of asbestos fibers each encased in a sheath consisting of a water-swellable, reversible gel-forming material which is chemically inert toward the asbestos fibers it encapsulates; and an acidic phosphatic material distributed throughout said matrix of gel encapsulated asbestos fibers, there being between 5% and 20% by weight of said phosphatic material in said board product and between 0.5% and 5% of said gel-forming material in said board product, based on the weight of said asbestos fibers.

References Cited in the file of this patent

UNITED STATES PATENTS

| | | |
|---|---|---|
| 1,415,850 | Erdahl | May 9, 1922 |
| 1,967,062 | Novak | July 17, 1934 |
| 2,198,800 | Badollet | Apr. 30, 1940 |
| 2,485,458 | Quinn | Oct. 18, 1949 |
| 2,567,559 | Greider | Sept. 11, 1951 |

FOREIGN PATENTS

| | | |
|---|---|---|
| 759,931 | Great Britain | Oct. 24, 1956 |